United States Patent [19]
Hoogendoorn et al.

[11] Patent Number: 4,636,874
[45] Date of Patent: Jan. 13, 1987

[54] SYSTEM FOR REPRODUCING INFORMATION SIGNALS ON A MAGNETIC TAPE WHICH INCREMENTALLY ADJUSTS, IN A PLURALITY OF STEPS THE SPEED OF THE MAGNETIC TAPE AND THE POSITIONING AND ROTATIONAL SPEED OF THE MAGNETIC HEAD UPON A CHANGE OF MODE

[75] Inventors: Abraham Hoogendoorn; Franz Kuchar, both of Vienna, Austria

[73] Assignee: U.S. Philips Corporation, New York, N.Y.

[21] Appl. No.: 587,790

[22] Filed: Mar. 9, 1984

[30] Foreign Application Priority Data

Mar. 15, 1983 [AT] Austria .................... 909/83

[51] Int. Cl.$^4$ ...................... H04N 5/782; G11B 21/10
[52] U.S. Cl. .................... 360/10.2; 360/10.3; 360/77
[58] Field of Search .................... 360/10.2, 10.1, 10.3, 360/70, 76, 77, 75

[56] References Cited

U.S. PATENT DOCUMENTS

| | | | |
|---|---|---|---|
| 4,163,993 | 8/1979 | Ravizza | 360/10.2 |
| 4,189,758 | 2/1980 | Morio et al. | 360/76 X |
| 4,255,768 | 3/1981 | Kubota | 360/76 X |
| 4,255,771 | 3/1981 | Kubota | 360/77 |
| 4,287,538 | 9/1981 | Sakamoto et al. | 360/70 X |
| 4,366,515 | 12/1982 | Takano et al. | 360/77 |
| 4,370,685 | 1/1983 | Hosoi et al. | 360/10.2 X |
| 4,520,410 | 5/1985 | Sekiguchi et al. | 360/10.2 X |

Primary Examiner—Raymond F. Cardillo
Assistant Examiner—Wayne R. Young
Attorney, Agent, or Firm—Thomas A. Briody; Jack Oisher; William J. Streeter

[57] ABSTRACT

A system (1) for reproducing information signals recorded on a magnetic tape (2) in oblique tracks (S) in different modes of operation with different tape speeds v(n) includes a tape drive device (13), which is switchable in respect of the tape speed, at least one magnetic head (K1, K2), which is rotatable by a head drive device (32), which is switchable as regards the speed of rotation, and a tracking servo system (41) for guiding said head along the tracks, and including a sawtooth generator (67) whose signal waveform is variable in order to generate a sawtooth-shaped control signal. In the case of a change of mode, the tape drive device (13), the sawtooth generator (67) and the head drive device (32) are set to different operating values by a switching device (12). The switching device (12) includes a stepping signal generator (91) for generating control signals (TW(n), DS(n), TV(n)) which are supplied incrementally in a plurality of steps and which change in value upon every step during a change of mode, by which control signals, the tape drive device (13), the sawtooth generator (67) and the head drive device (32) can be switched over stepwise in stages defined by the values of the control signals in order to ensure an undisturbed reproduction of the information signals in the case of a change of mode.

16 Claims, 14 Drawing Figures

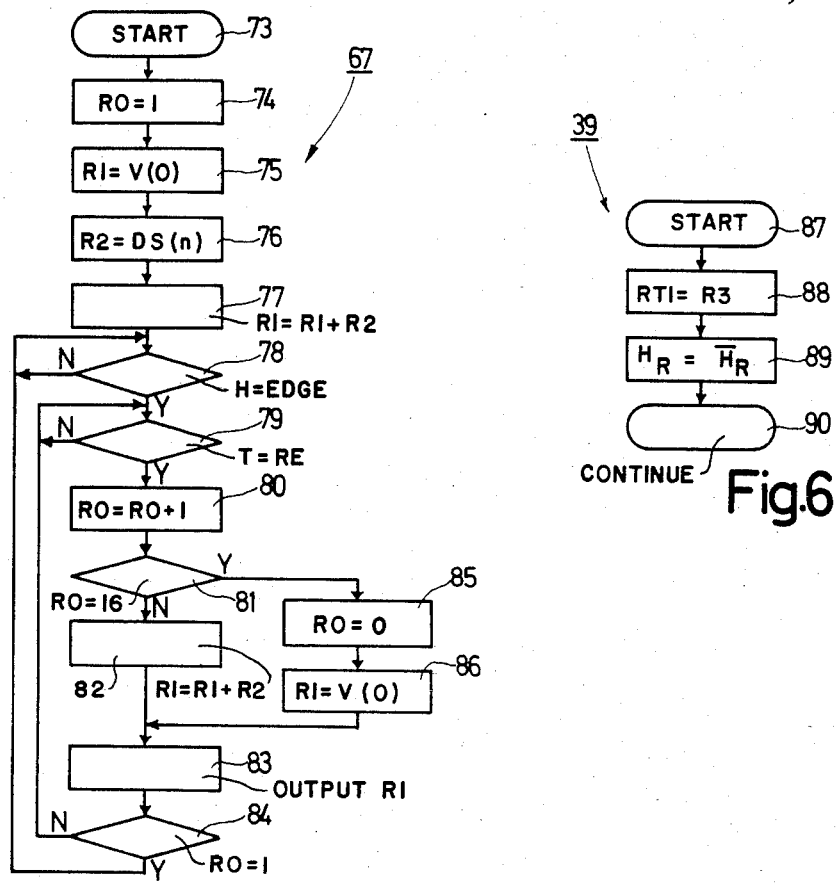
Fig.4
Fig.6
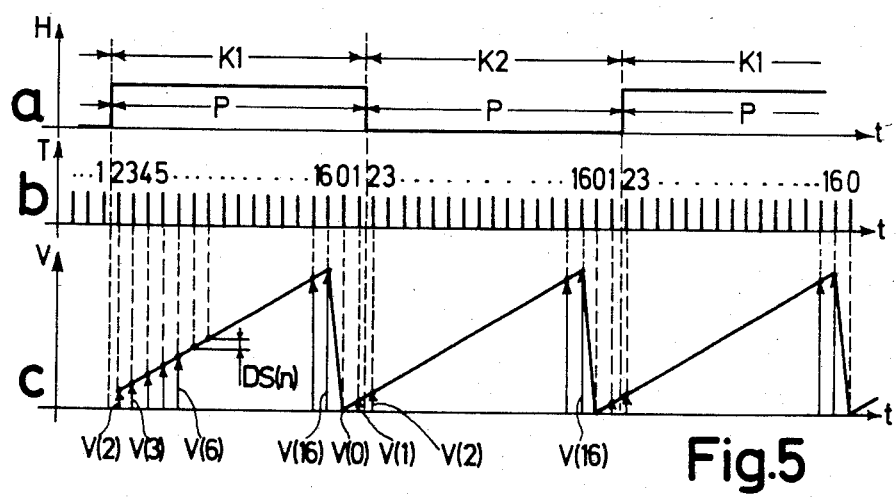
Fig.5

| Z(n) | | v(n) | TW(n) | | DS(n) | | TV(n) | | ZS(n) | |
|---|---|---|---|---|---|---|---|---|---|---|
| Z(0) | 237 | +7·v | TW(0) | 16 | DS(0) | −96 | TV(0) | −19.424 | ZS(0) | 397 |
| Z(1) | 238 | | TW(1) | 17 | DS(1) | −90 | TV(1) | −19.435 | ZS(1) | 412 |
| Z(2) | 239 | | TW(2) | 18 | DS(2) | −84 | TV(2) | −19.445 | ZS(2) | 428 |
| ⋮ | ⋮ | | ⋮ | ⋮ | ⋮ | ⋮ | ⋮ | ⋮ | ⋮ | ⋮ |
| Z(38) | 275 | +3·v | TW(38) | 39 | DS(38) | −32 | TV(38) | −19.808 | ZS(38) | 944 |
| ⋮ | ⋮ | | ⋮ | ⋮ | ⋮ | ⋮ | ⋮ | ⋮ | ⋮ | ⋮ |
| Z(60) | 297 | +1·v | TW(60) | 121 | DS(60) | 0 | TV(60) | −20.000 | ZS(60) | 2850 |
| Z(61) | 298 | | TW(61) | 167 | DS(61) | +3 | TV(61) | −20.018 | ZS(61) | 3933 |
| ⋮ | ⋮ | | ⋮ | ⋮ | ⋮ | ⋮ | ⋮ | ⋮ | ⋮ | ⋮ |
| Z(65) | 302 | +1/2·v | TW(65) | 244 | DS(65) | +8 | TV(65) | −20.048 | ZS(65) | 5737 |
| ⋮ | ⋮ | | ⋮ | | ⋮ | ⋮ | ⋮ | ⋮ | ⋮ | |
| Z(70) | 307 | 0·v | TW(70) | | DS(70) | +16 | TV(70) | −20.096 | ZS(70) | |
| ⋮ | ⋮ | | ⋮ | ⋮ | ⋮ | ⋮ | ⋮ | ⋮ | ⋮ | ⋮ |
| Z(78) | 315 | −1·v | TW(78) | 121 | DS(78) | +32 | TV(78) | −20.160 | ZS(78) | 2850 |
| ⋮ | ⋮ | | ⋮ | ⋮ | ⋮ | ⋮ | ⋮ | ⋮ | ⋮ | ⋮ |
| Z(119) | 356 | −5·v | TW(119) | 24 | DS(119) | +96 | TV(119) | −20.576 | ZS(119) | 589 |

Fig.7

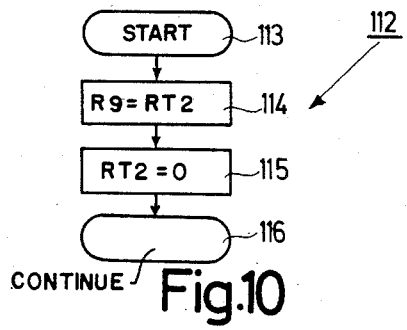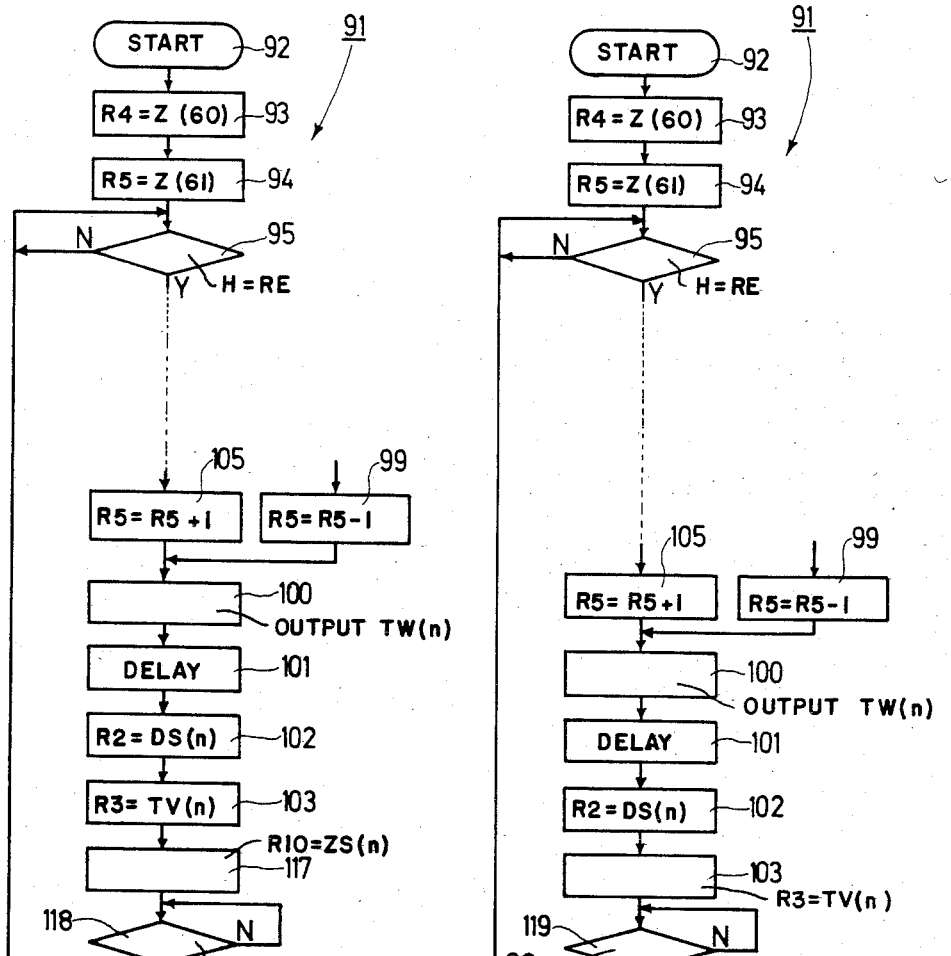

SYSTEM FOR REPRODUCING INFORMATION SIGNALS ON A MAGNETIC TAPE WHICH INCREMENTALLY ADJUSTS, IN A PLURALITY OF STEPS THE SPEED OF THE MAGNETIC TAPE AND THE POSITIONING AND ROTATIONAL SPEED OF THE MAGNETIC HEAD UPON A CHANGE OF MODE

BACKGROUND OF THE INVENTION

The invention relates to a system for reproducing information signals, recorded on a magnetic tape in parallel adjacent tracks which extend obliquely relative to the longitudinal direction of said tape, in different modes of operation with different predetermined speeds of the magnetic tape, which modes can be switched on by actuation of a mode selection device, which system comprises a tape-drive device which is switchable to drive the magnetic tape at different speeds, at least one magnetic head which is rotatable by means of a head-drive device for consecutively scanning the tracks, and a tracking servo system for guiding said head along the tracks, which servo system, in order to position the magnetic head in a direction transverse to the tracks, comprises an electromechanical positioning device which can be driven by a drive signal, which comprises a tracking signal generated by a control circuit of the tracking servo system, and a sawtooth-shaped control signal whose waveform is adapted to the instantaneous speed of the magnetic tape, and a variable-waveform sawtooth generator for generating the sawtooth-shaped control signal, there being provided a switching device which is responsive to the actuation of the mode-selection device to produce at least one switching signal for switching over the tape-drive device and the sawtooth generator when the mode of operation is changed, which switching device switches over the tape-drive device as regards the speed of the magnetic tape and the sawtooth generator as regards the signal waveform of the control signal in a predetermined switching process and in conformity with each other.

A system of the type specified in the foregoing is known, for example, from the video tape recorders which are commercially available under the type designations VR 2024 and VR 2220 for the recording and/or reproduction of television signals. By means of these video recorders, television signals can be recorded on the magnetic tape in parallel contiguous tracks which extend obliquely to the longitudinal direction of said tape at a so-called normal speed of the tape by means of two magnetic heads which are arranged diametrically opposite one another on a rotatable magnetic-head unit. Normal reproduction of television signals thus recorded is effected at the same normal speed with which they had been recorded. In order to obtain special motion effects, such as slow-motion or fast-motion effects, and also to enable a so-called search mode for the rapid location of specific pictures, these recorders can also reproduce the television signals in modes which differ from normal reproduction, the speed of the magnetic tape differing from the normal speed both as regards the magnitude and the sign, which defines the direction of movement of the magnetic tape, the tracking servo system ensuring that despite the changed scanning conditions, the magnetic heads accurately follow the tracks recorded on the magnetic tape, so that also in these reproduction modes, a correct and undisturbed reproduction of the television signals is guaranteed. It is obvious that these video recorders may also be switched from one reproduction mode to another, for example, once the desired picture has been found after a search mode, a normal reproduction mode may be selected.

In the system used in the two known video recorders for the reproduction of television signals, switching between two reproduction modes with different speeds of the magnetic tape, is effected abruptly when the user actuates a corresponding mode switch of a mode-selection device comprising a plurality of mode switches. When such a mode switch is actuated, both the tape drive device and the sawtooth generator of the tracking servo system must be set immediately to the operating values corresponding to the desired mode in a single-step switching operation. However, since both the tape-drive device and the electromechanical positioning devices of the tracking servo system for the two diametrically arranged magnetic heads, which positioning devices are driven by the sawtooth-shaped control signal from the sawtooth generator, are not capable of performing comparatively large abrupt jump-like of movement changes because their dynamic properties and, moreover, the dynamic properties of the tape-drive device and the positioning devices of the tracking servo system differ completely from each other, the coordinated, mutually synchronous operation of the tape-drive device and the tracking servo system, by means of which the magnetic heads follow the tracks recorded on the magnetic tape driven by the tape-drive device, is lost temporarily when the mode of operation is changed. In the case of such a change of mode, this results in the scanning of the television signals stored in the tracks, being disturbed, which in turn gives rise to annoying disturbances in the reproduction of the television signals on the screen of a television receiver.

SUMMARY OF THE INVENTION

It is the object of the invention to provide a system of the type specified in the opening paragraph, which, in a simple and reliable manner, also guarantees a correct and undisturbed scanning of the information signals recorded on the magnetic tape during a change of mode in order to achieve an undisturbed reproduction of these signals. To this end the invention is characterized in that the switching device comprises a stepping-signal generator which is operable by actuation of the mode selection device to generate switching signals which, in the case of a change of mode, are supplied in a plurality of steps which succeed each other automatically and continuously, which switching signals change in value upon every step and switch over the tape-drive device and the sawtooth signal generator, with respect to the speed of the magnetic tape and the signal waveform of the control signal, in conformity with each other, stepwise in stages which are defined by the values of the switching signals and which are adapted to each other, the switching process being divided into switching intervals defined by the step sequence of the switching signals from the stepping signal generator.

Dividing the switching process for the tape-drive device and the sawtooth generator of the tracking servo system in the case of a change over between two reproduction modes in substantial arbitrarily small switching intervals which succeed each other stepwise, precludes an abrupt change-over and ensures that the tape-drive device, with respect to the speed of the magnetic tape, and the sawtooth generator, with respect to the waveform of the control signal for the electromechanical positioning device of the tracking servo system, are changed over in conformity with each other in a plurality of substantially arbitrarily small stages by the stepwise supplied switching signals, so that the different dynamic properties of the tape-drive device and the electromechanical positioning device of the tracking servo system have substantially no effect and, consequently, for each speed of the magnetic tape defined by a switching signal of one of said plurality of steps upon a change of mode, the tracking servo system ensures that the magnetic head always accurately follows the tracks to be scanned by the application of the sawtooth-shaped control signal to the electromechanical positioning device for said head, the waveform of said sawtooth signal being defined by the corresponding switching signal of this step and being adapted to the speed of the magnetic tape. This ensures that also, in the case of a change of mode, the tape-drive device and the tracking servo system operate in synchronism with each other in an accurately coordinate manner. Thus, during a change of mode, the information signals are always scanned correctly and without disturbances, thereby guaranteeing an undisturbed reproduction of the information signals during a change from one reproduction mode to another.

It is to be noted that DE-PS No. 27 11 703 (corresponding U.K. No. 1579854) describes a system for reproducing television signals recorded in oblique tracks on a magnetic tape in which the speed of the magnetic tape can be varied in substantially arbitrarily small steps between the normal speed and tape stoppage, as in the case of a so-called still-picture reproduction. However, in this system, the tracking servo system for guiding the magnetic head along the tracks comprises only one control circuit for generating a drive signal for the electromechanical positioning device for the magnetic head, by means of which deviations from the scanning path of the magnetic head relative to the tracks recorded on the magnetic tape as a result of the varying speed of the magnetic tape are compensated for, but there is not provided a switchable sawtooth generator for generating a sawtooth-shaped control signal for the electromechanical positioning device which is adapted to the varying speed, as in the system defined in the opening paragraph. As a result of this, the control circuit of the tracking servo system in the known system must handle control signals of comparatively high amplitudes, which reduces the sensitivity and the tracking accuracy of the tracking servo system. In the system in accordance with the invention, in which the drive signal comprises a tracking signal and a sawtooth-shaped control signal, the control circuit of the tracking servo system must handle signals of low amplitude only, which results in high sensitivity and high tracking accuracy of the tracking servo system.

Moreover, it is to be noted that EP-OS No. 0,037,738 and EP-OS No. 0,043,739 (corresponding U.S. Pat. Nos. 4,426,665 and 4,393,416) disclose systems for reproducing television signals recorded in oblique tracks on a magnetic tape which comprise a tape-drive device which is switchable with respect to the speed and a sawtooth generator which is switchable with respect to the signal waveform. However, in these known systems, the tape-drive device is first switched over with respect to the speed of the magnetic tape in a manner not described, after which the change of the speed of the magnetic tape is detected by a detection device which supplies a detection signal and subsequently, depending on the detection signal supplied, the sawtooth generator is changed over with respect to the signal waveform of the control signal, the signal waveform of the sawtooth-shaped control signal being determined by the detection signal which is generated depending on the detected speed of the magnetic tape. This is a rather intricate solution requiring, comparatively, much circuitry; moreover, the control-signal waveform to be adapted to the speed, depends on the detection speed and the detection accuracy of the detection device. However, in the system in accordance with the invention, the tape-drive device and the sawtooth generator are switched over in a particularly simple manner in conformity with each other in a plurality of steps which succeed each other automatically and continuously, both the tape-drive device and the sawtooth generator being changed over together with the switching signals of the relevant steps upon every step of the stepping signal generator so that, in a simple manner and without any further aids, the speed of the magnetic tape and the waveform of the sawtooth-shaped control signal are always adapted to one another directly and are accurately defined by the values of these switching signals, which values change from step to step.

In a system of the type set forth in the opening paragraph, it is also known to switch over the head drive device for the magnetic head with respect to the speed of rotation of the magnetic head in conformity with the tape-drive device, in order to preclude time-base errors in the information signals which are reproduced by the magnetic head in modes with different speeds of the magnetic tape. Such a system is also employed in, for example, the aforementioned video tape recorders VR 2024 and VR 2220. In such a system, it is found to be advantageous if, in the case of a change of mode, the stepping signal generator supplies additional switching signals in a plurality of steps which succeed each other automatically and continuously, which additional switching signals have values which change upon every step and which provide a stepwise change-over of the head drive device with respect to the speed of rotation of the magnetic head, in stages which are defined by the values of the additional switching signals and which are adapted to the stages, in which the tape-drive device and the sawtooth generator are switched over with respect to the speed of the magnetic tape and the waveform of the control signal. In this way, it is achieved that in addition to the speed of the magnetic tape and the waveform of the sawtooth-shaped control signal for the electromechanical positioning device of the tracking servo system, the speed of rotation of the magnetic head is also switched over stepwise in substantially arbitrarily small stages upon a change of mode, so that in the case of a change of mode, the tape-drive device, the tracking servo system and the head-drive device are always operated exactly synchronously and adapted to each other. The stepwise change-over of the speed of rotation of the magnetic head in substantially arbitrarily small stages guarantees that also, when the mode of operation is changed, no time-base errors occur in the information signals being reproduced. This is particularly effective in the case of color television signals because time-base errors in the reproduction of color television signals are particularly annoying because of the resulting color faults.

With respect to the timing of the steps of the switching signals supplied by the stepping signal generator, it is found to be advantageous if the stepping signal generator supplies the switching signals in consecutive steps at equal time intervals. This results in a particularly simple timing of the stepping signal generator with respect to the steps of the switching signals. This is particularly effective if the lengths of the stages, in which switching-over is effected during a change of mode and which are defined by the values of the switching signals, are always equal.

If the lengths of the stages in which switching-over is effected during a change of mode are different, it is found to be advantageous if the stepping signal generator supplies the switching signals in consecutive steps at time intervals which are proportional to the lengths of the stages which are defined by the values of the switching signals and which are adapted to one another. As a result of this, the timing of the stepping signal generator with respect to the steps of the switching signals, depends on the lengths of the stages in which switching-over is effected during a change of mode and which are defined by the values of the switching signals, so that the steps are adapted to the lengths of the stages in a simple manner.

With respect to the timing of the steps of the switching signals supplied by the stepping signal generator, it is also found to be advantageous if the stepping signal generator supplies the switching signals in consecutive steps at time intervals which are defined by a comparator device which cooperates with the stepping signal generator, the detection signals supplied by the detection device, which cooperates with the magnetic tape to detect the speeds of said tape, and reference signals whose values correspond to the speeds of the magnetic tape as defined by the switching signals supplied, in steps, by the signal generator, being applied to the comparator device for comparison, which comparator device enables the stepping signal generator to supply switching signals in conformity with the next step when the signals applied to said device coincide. Thus, switching signals in conformity with the next step can be supplied only if the tape-drive device actually drives the magnetic tape with the speed defined by the relevant switching signal in the preceding step. This precludes the occurrence of an excessive stepping rate which cannot be followed by the tape-drive device because of the mechanical specification of a system in accordance with the invention, without its operation in synchronism with and adapted to the operation of the tracking servo system being disturbed. In this way, the timing of the stepping signal generator with respect to the steps of the switching signals is simply adapted to the mechanical specifications of the tape-drive device. This is particularly effective if, in a system in accordance with the invention, the mechanical specifications of the tape-drive device can vary over a comparatively wide range, which is, for example, the case if the system employs different magnetic-tape cassettes with different lengths of tape or which may depend on whether a change of mode is effected nearer the beginning or the end of the tape, because this also influences the drive conditions for the tape-drive device.

With respect to the construction of the stepping signal generator, it is found to be advantageous if the stepping signal generator is formed by means of a programmable data processing unit. This results in a particularly simple, compact and reliable construction. Preferably, the data processing unit comprises a microprocessor.

In this respect, it is also found to be advantageous if the data processing unit is also employed for forming the comparator device and the detection device. In this way the comparator device and the detection device are also formed by means of the data processing unit in a simple, compact and reliable manner without the use of additional means.

With respect to the reference signals applied to the comparator device, it is possible to compute the value of the corresponding reference signal upon each step of the stepping signal generator in a separate computing operation by means of the data processing unit. However, such a computing operation requires a comparatively long time. Therefore, it is found to be advantageous if the values of the reference signals applied to the comparator device for all the steps of the stepping signal generator are stored in the data processing unit, in the form of a table. Thus, the value of the reference signal for each step of the stepping signal generator is available particularly rapidly without the waiting time necessary for a computing operation, while the available storage capacity is also utilized in a favorable manner.

The values of all the switching signals for all the steps of the stepping signal generator may also be computed by the data processing unit in a separate computing operation for each step. However, in this respect also it is found to be advantageous if the values of all the switching signals for all the steps of the stepping signal generator are stored in the data processing unit in the form of a table. This also yields a particularly short access time to the values of the switching signals during every step of the stepping signal generator, the available storage capacity being also utilized in a particularly favorable manner.

DESCRIPTION OF THE DRAWINGS

Embodiments of the invention will now be described in more detail, by way of example, with reference to the accompanying drawings, wherein.

FIG. 4 is a flow chart for a programme sequence used when a sawtooth generator is formed by means of a microprocessor as shown in FIG. 3;

FIGS. 5a to 5c are waveform diagrams to illustrate the operation of the sawtooth generator using the programme sequence shown in FIG. 4;

FIG. 6 is a flow chart for a programme sequence used for the formation of a squarewave generator by means of a microprocessor as shown in FIG. 3;

FIG. 7 is a table containing values of the switching signals supplied by the stepping signal generator and the values of the reference signals which can be applied to the comparator device which cooperates with the stepping signal generator, which values are stored in the form of a corresponding table in a memory of the microprocessor shown in FIG. 3;

FIG. 10 is a flow chart for a program sequence used when a detection device for detecting the speed of the magnetic tape is formed by a microprocessor as shown in FIG. 3;

FIG. 11 is a flow chart for forming a stepping signal generator by a microprocessor as shown in FIG. 3, which generator supplies the switching signals in steps at time intervals which are defined by the comparator device formed by the microprocessor; and FIG. 12 is a flow chart for the formation of a stepping signal generator by a microprocessor as shown in FIG. 3, which generator supplies the switching signals in steps at time intervals which are defined by a comparator device which is external to the microprocessor.

DESCRIPTION OF THE PREFERRED EMBODIMENTS

Figure 1:
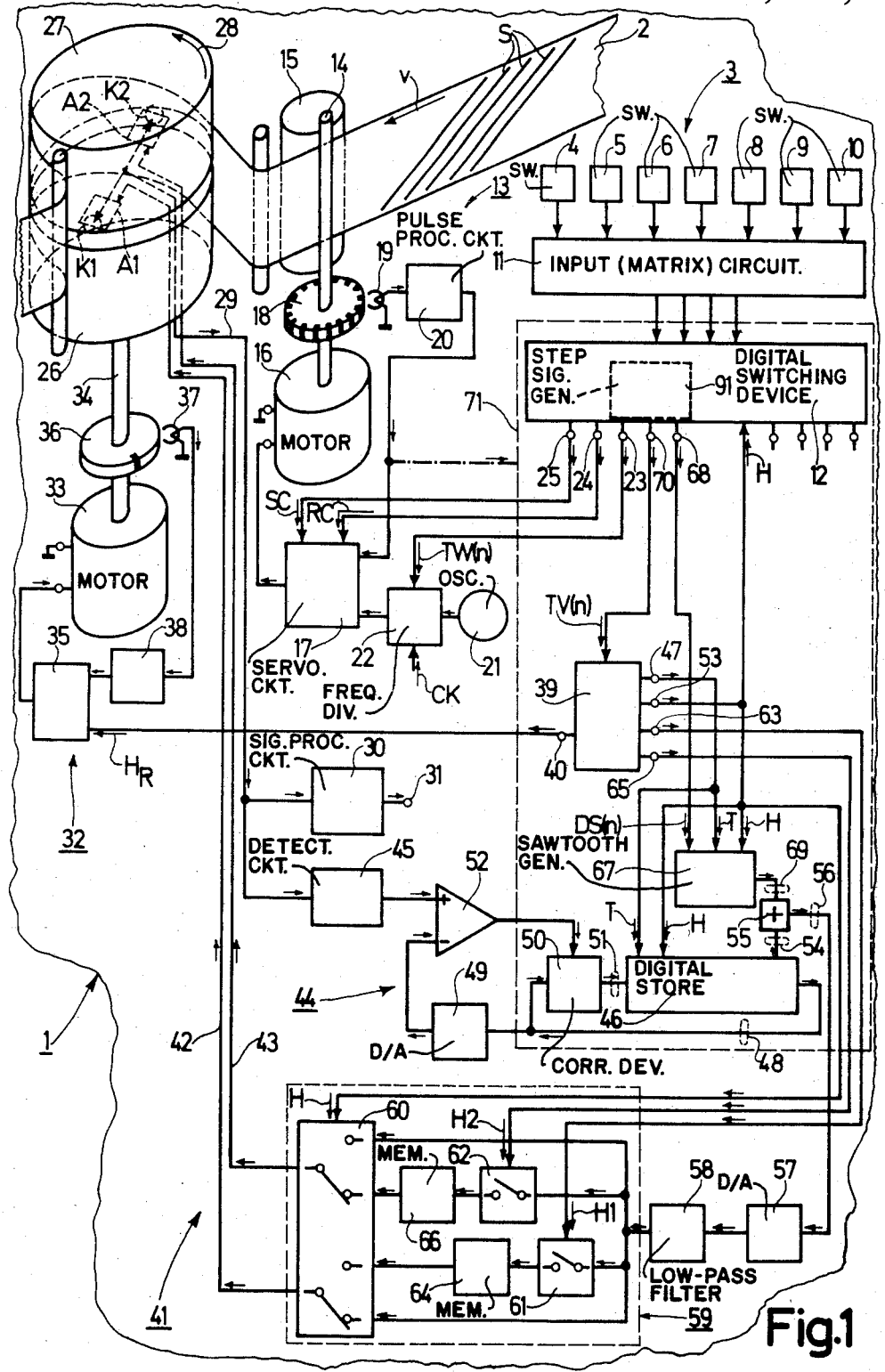
FIG. 1 shows, schematically, the relevant part of a system for reproducing color television signals, which system incorporates a switching device with a stepping signal generator in accordance with the subject invention.

FIG. 1 shows a system 1 for reproducing color television signals recorded on a magnetic tape 2 in parallel adjacent tracks S which extend obliquely relative to the longitudinal direction of the magnetic tape, as is symbolically shown in FIG. 1. Recording the color television signals in the tracks S is effected at a so-called normal speed v, as is indicated by the arrow v in FIGS. 1 and 2. Each track contains one field of the color television signal and, in order to achieve a high recording density, the tracks are contiguous without intermediate spacing. By means of the system 1, the color television signals can be reproduced in seven different modes, with speeds of the magnetic tape 2 which differ in value and sign. For switching to these modes, the system 1 comprises a mode selection device 3 comprising seven mode switches 4, 5, 6, 7, 8, 9 and 10. The mode switch 6 serves for selecting so-called normal reproduction, for which the speed +1.v of the magnetic tape corresponds to the normal speed v during recording both in respect of its value and sign. The mode switch 5 serves for selecting a so-called fast-motion mode in which the speed +3.v of the magnetic tape has the same sign but is three times the normal speed v. By means of the mode switch 4 it is possible to select a reproduction mode for rapidly searching pictures situated after the pictures being reproduced, the speed +7.v of the magnetic tape having the same sign but being seven times the normal speed v. The mode switch 7 serves for switching on a so-called slow-motion mode in which the speed +½.v of the magnetic tape has the same sign but is half the normal speed v. The mode switch 8 serves for switching on a reproduction mode which is generally referred to as still picture mode, in which the speed of magnetic tape is zero, i.e. in which the magnetic tape is stationary. With the mode switch 9, it is possible to switch on a reproduction mode in which the movements in the pictures being reproduced are reversed in comparison with normal reproduction, the speed −1.v of the magnetic tape being the same as the normal speed v but having the opposite sign. The mode switch 10 serves for switching on a reproduction mode for rapidly searching pictures which are situated before the picture being reproduced, the speed −5.v of the magnetic tape being five times the normal speed v and having the opposite sign. The seven mode switches of the mode selection device 3 cooperate with an input circuit 11 of this device, which circuit, via four output lines, drives a digital switching device 12 for the generation of switching signals. In known manner the input circuit 11 comprises a matrix circuit, the actuated state of a mode switch being cyclically interrogated and stored by means of a microcomputer. The input circuit 11 supplies a parallel 4-bit status word to the switching device 12 via four output lines, the value of the status word depending on which mode switch has been actuated. In this way, the switching device 12 can be controlled by the mode selection device 3. Depending on the actuation of the mode selection device 3, the switching device 12 can generate switching signals by means of which the switching device 12 in the system 1 switches on the mode corresponding to the actuated mode switch of the mode selection device 3. The operation of the switching device 12 will be described in more detail hereinafter.

For driving the magnetic tape 2 with different speeds, the system 1 comprises a tape drive device 13 which can be set to different speeds. This device comprises a rotatable capstan 14, to which the magnetic tape 2 can be applied by means of a pressure roller 15 which is movable in a manner not shown. The capstan 14 comprises the shaft of a tape-drive motor 16 and is consequently rotatable by this motor. The motor 16 is connected to the output of a tape-drive servo circuit 17. A disc 18 is rigidly connected to the capstan 14, the disc circumference being provided with a multitude of magnet poles, which are symbolically shown in FIG. 1, and, as the capstan 14 rotates, induce a pulse-shaped signal in a magnetic head 19 which is arraged opposite the circumferential surface of the disc 18, the frequency of this pulse-shaped signal being a measure of the speed of rotation of the capstan 13 and hence a measure of the actual speed of the magnetic tape. In practice, it is found to be effective if, for the normal speed of the magnetic tape, the frequency of the signal lies in the range of approximately 400 Hz. The disc 18 and the magnetic head 19 form a magnetically operating tachogenerator for generating a signal which is proportional to the actual speed of the magnetic tape; obviously, optically, inductively or capacitively operating tachogenerators may be employed instead. The pulse-shaped signal induced in the magnetic head 19 is applied to a pulse-processing circuit 20, in which, for example, the pulses are shaped and subsequently amplified, the pulse-shaped output signal being applied to an input of the servo circuit 17 as the so-called actual-value signal. A pulse signal generated by an oscillator 21 and divided in frequency by a frequency divider 22 is applied to a further input of the servo circuit 17 as the so-called desired-value signal, whose frequency defines the speed of the magnetic tape. In known manner, for which reason this is not described in more detail, the servo circuit 17 generates a correction signal by comparing the actual-value signal and the desired-value signal, which correction signal is applied to the tape-drive motor 16 via the output of the servo circuit 17 so that this motor drives the magnetic tape 2 via the capstan 14 at the speed defined by the desired-value signal.

As stated, the tape-drive device 13 is switchable with respect to the speed of the magnetic tape 2, switching over being possible with respect to both the magnitude and the sign of the speed. The magnitude of the speed is switched over simply in that, depending on the desired value of the speed of the magnetic tape, pulse signals of different frequencies are applied to the tape-drive servo circuit 17 as desired-value signals. In order to obtain the desired-value signals of different frequencies in a simple manner, the frequency divider 22 arranged after the oscillator 21 is constructed as a frequency divider with a switchable divisor. Such a switchable frequency divider is incorporated in, for example, the integrated circuit which is commercially available under the type designation SAB 3030 P. In order to change the divisor of such a switchable frequency divider 22, switching signals of different values formed by the digital divider words TW(n) may be applied to a control input of this divider, as is indicated in FIG. 1. The divider words TW(n) are formed by bit words of variable value which are applied to the control input of the frequency divider 22 in serial form. Moreover, it is to be noted that for triggering such a frequency divider 22, a clock signal CK is also applied, which is schematically indicated in FIG. 1. As will be explained in more detail hereinafter, the divider words TW(n) applied to the switchable frequency divider 22 as switching signals are generated by the digital switching device 12 and are applied from an output 23 of this device 12 to the control input of the frequency divider 22. In the frequency divider, each of these divider words results in a divisor which depends on the value of the divider word. For changing the sign of the speed, which defines the direction of transport, the switching device 12 produces a switching signal RC on an output 24, which signal is applied to a control input of the tape-drive servo circuit 17 and switches over the servo circuit 17 in such a manner that the magnetic tape is driven in a direction opposite to that during normal reproduction. In addition, the switching device 12 produces a switching signal SC on an output 25, which signal is applied to a further control input of the servo circuit 17 and controls the servo circuit 17 in such a manner that the tape-drive motor 6 is stopped so that the transport of the magnetic tape is stopped, as is required in still-picture reproduction.

In the system 1, the magnetic tape 2 is wrapped around the circumferential surfaces of two coaxial drum halves 26 and 27 along a helical path of approximately 180°. The drum half 26 is stationary, while the drum half 27 is rotatable in a direction of rotation indicated by an arrow 28. On the rotatable drum half 27, two magnetic heads $K_1$ and $K_2$ are arranged diametrically opposite one another and cooperate with the magnetic tape via the gap formed between the two drum halves, which heads serve for consecutively scanning the tracks S recorded on the magnetic tape and for reproducing the color television signals recorded in these tracks. Because of the diametrical arrangement of the magnetic heads and the selected wrapping angle of approximately 180° of the magnetic tape around the two drum halves 26 and 27, only one magnetic head at a time cooperates, in fact, with the magnetic tape for a scanning period P, because one magnetic head enters into contact with the magnetic tape when the other magnetic head is lifted off the magnetic tape after scanning. Obviously, the scanning period P depends on the speed of revolution of the magnetic heads and, in the case of normal reproduction, it corresponds to the reciprocal of the field or vertical synchronizing frequency of a color television signal. For example, during normal reproduction in a system for PAL color television signals, the scanning period P for each magnetic head $K_1$ and $K_2$ is 20 ms. The magnetic heads $K_1$ and $K_2$ are connected to a signal line 29 via a rotary transformer, which is not shown for the sake of simplicity, via which line 29 the color television signals scanned by the magnetic heads are applied to a signal processing circuit 30 for the processing of these signals. The signals thus processed by the signal processing circuit 30 are available on its output terminal 31 for reproduction on the screen of a color television receiver.

For rotating the two magnetic heads $K_1$ and $K_2$ mounted on the drum half 27, there is provided a head drive device 32 comprising a head drive motor 33, whose shaft 34 rotates the drum half 27 in the direction indicated by the arrow 28. The head drive motor 33 is connected to the output of a head-drive servo circuit 35. A disc 36 is rigidly connected to the shaft 34 and is provided with a magnet pole, shown symbolically, on its circumference, which, as the shaft 34 rotates, induces a pulse-shaped signal in a further magnetic head 37 arranged opposite the circumferential surface of the disc 36. It is obvious that instead of this magnetically operating tachogenerator comprising the disc 36 and the magnetic head 37, tachogenerators operating in accordance with different principles may be employed. The pulse-shaped signal induced in the magnetic head 37 is applied to a further pulse processing circuit 38, in which the pulses are, for example, shaped and subsequently amplified, the pulse-shaped output signal being applied to an input of the servo circuit 35 as the actual-value signal. A pulse signal $H_R$, produced on an output 40 of a pulse generator 39, is applied to a further input of the servo circuit 35 as the desired-value signal and defines the speed of rotation of the magnetic heads $K_1$ and $K_2$. In the present case, the period of this pulse signal $H_R$, which serves as the desired-value signal, corresponds to twice the value of the scanning period P in which a magnetic head, $K_1$ or $K_2$, cooperates with the magnetic tape 2 for scanning a track and, consequently, it is 40 ms during normal reproduction in a system for PAL color television signals. In known manner, for which reason this is not described in more detail, the head-drive servo circuit 35 forms a tracking signal by phase comparison of the actual-value signal and the desired-value signal, which tracking signal is applied to the head drive motor 33 via the output of the servo circuit 35, so that, via the shaft 24, this drive motor 33 drives the magnetic heads $K_1$ and $K_2$ at the speed defined by the desired-value signal. In order to achieve a higher control stability and a larger control bandwidth, it is to be noted that in practice, in addition to the phase control circuit, the head-drive servo circuit 35 comprises a so-called speed-control circuit. For this purpose a further tachogenerator is mounted on the shaft 34 of the head-drive motor 33 and supplies a pulse-shaped tacho signal of higher frequency than the tacho signal from the tachogenerator 36, 37, to the speed control circuit for the head-drive servo circuit 35 as the actual-value signal, said speed control circuit generating an additional control circuit signal for the head drive motor 33. Moreover, for the sake of simplicity, this is not shown because it is irrelevant to the present invention.

Figure 2:
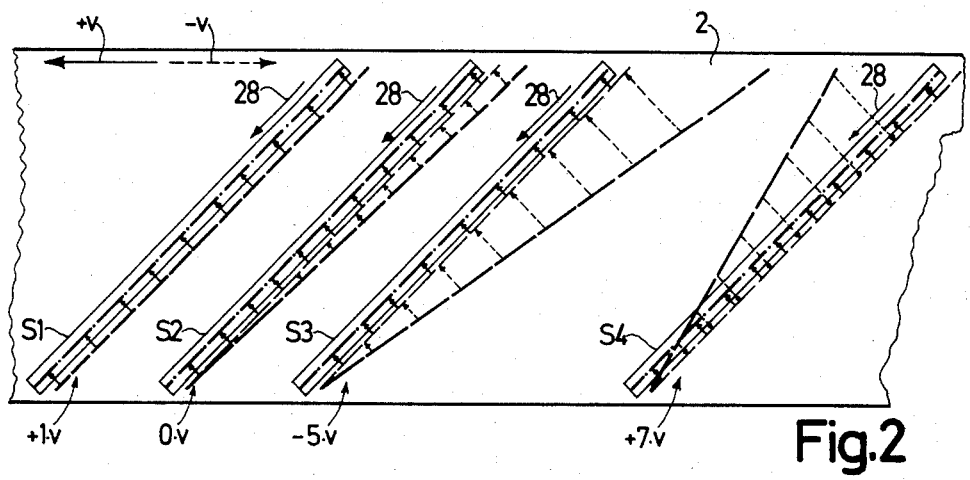
FIG. 2 illustrates, schematically, the scanning conditions for the magnetic heads when oblique tracks recorded on the magnetic tape are scanned at different speeds of the magnetic tape.

The two magnet heads $K_1$ and $K_2$ serve for scanning the oblique tracks S recorded on the magnetic tape. In FIG. 2 one of these tracks bears the reference S1 and is represented by a solid rectangle, the track center being indicated by a dash-dot line. The dashed lines schematically represent the scanning path of a magnetic head $K_1$ or $K_2$ which is rotated in the direction indicated by the arrow 28, which path will be followed if no special steps are taken when the magnetic tape 2 is driven with the normal speed $+1.v$ by the tape drive device 13 during reproduction and during recording of the tracks. As can be seen, this scanning path exhibits a tracking error relative to the track center which, on an average, remains constant and which is symbolically represented by the solid arrows. It is evident that, in practice, the value of the actual tracking error is not constant but varies over the entire length of a track. However, these variations of the actual tracking error relative to the average tracking error are comparatively small, so that, for the sake of simplicity, only the average tracking error will be considered hereinafter. As is known, such a tracking error may be caused by, for example, expansion of the magnetic tape, the influence of temperature, humidity and tolerances, and also, in the case of so-called external recordings, when the tracks have been recorded with a system other than the reproducing system. The dashed lines indicate the scanning path of a magnetic head $K_1$ or $K_2$ relative to a track S2 that will be followed by said heads without special steps when the magnetic tape 2 is not moved during reproduction, i.e. is stationary as in the case of still-picture reproduction. As can be seen, this scanning path has a tracking error relative to the track center because of the different scanning conditions compared with reproduction at the normal speed, which error comprises two components, namely an average tracking error component which remains constant on the average and which is indicated symbolically by solid arrows, and a linearly varying tracking-error component indicated by the dashed arrows. The scanning path of a magnetic head $K_1$ or $K_2$ in relation to a further track S3 is represented by broken lines, which path will be followed if no special steps are taken when the magnetic tape is moved with a speed $(-5v)$ which is five times the normal speed in a direction opposite to that during normal reproduction. Again the tracking error comprises two components, but the linearly varying tracking error component now varies differently. The scanning path of a magnetic head $K_1$ or $K_2$ relative to a further track S4 which path will be followed if no special steps are taken, is indicated by broken lines when, during reproduction, the magnetic tape is moved with a speed corresponding to seven times the normal speed $(+7.v)$ in the same direction as during normal reproduction. Again, the linearly varying tracking error component varies in a different manner. It is known that the linearly varying tracking error component varies in conformity with the instantaneous speed of the magnetic tape.

It is obvious that if no special steps are taken, said tracking errors will disturb the reproduction of the color television signals recorded in the tracks, because, in the case of tracking errors, the color television signals recorded in the tracks can be read only partly or not at all by the magnetic heads. In order to eliminate such tracking errors, the system 1 comprises a tracking servo system 41 which ensures that the two magnetic heads $K_1$ and $K_2$ follow the tracks S recorded on the magnetic tape 2 and which, in order to position each of the two magnet heads $K_1$ and $K_2$ in a direction transverse to the tracks S, each comprise an electromechanical positioning device, A1 and A2, respectively, which may each comprise, for example, a piezoelectric bimorph actuator element, so as to achieve that scanning paths which coincide with the track centers represented by the dash-dot lines are followed by the magnetic heads instead of the scanning paths indicated by the dashed lines in FIG. 2. Via a slip-ring system, which is not shown for simplicity, a drive signal can be applied to the actuator elements A1 and A2 via the lines 42 and 43 for the deflecting the actuator elements A1 and A2, which, in response to the applied drive signal, guide the magnetic heads accurately along the recorded tracks. The drive signal comprises a tracking signal which is derived in a control circuit 44 of the tracking servo system 41 and which serves to compensate for the average tracking error component which, on the average, remains constant, and a sawtooth-shaped control signal whose waveform is adapted to the speed of the magnetic tape in order to compensate for the linearly varying tracking error component.

The control circuit 44 of the tracking servo system 41 will be described only briefly because such a control circuit is described in detail in DE-OS No. 30 07 874. The control circuit 44 comprises a detection circuit 45 which is connected to the signal line 29, by means of which circuit 45 the position of each magnetic head $K_1$ or $K_2$ relative to the tracks scanned by the magnetic head is detected and which, depending on the detected tracking error, generates a corresponding detection signal. For detecting tracking errors of the magnetic heads, it is customary to record long-wave tracking signals in the tracks together with the information signals, the frequency and/or phase of these tracking signals varying from track to track in conformity with a predetermined pattern. When a track is scanned by a magnetic head, the detection signal, which corresponds to the detected tracking error, is generated in the detection circuit 45 by a comparison with the tracking signals scanned by the magnetic head and produced by crosstalk from the track adjacent the track being scanned. For the construction of such a detection circuit, reference is made to, for example, DE-OS No. 25 30 482, DE-OS No. 27 01 318, DE-OS No. 28 09 402, or AT-PS No. 368,822 (corresponding U.S. Pat. No. 4056832, 4110799, 4297733, 4439799).

The control circuit 44 further comprises a digital storage device 46 for the storage of a predetermined number of signal values in digitally coded form, which device may comprise, for example, a digital shift register. The digital signal values stored in the storage device 46 appear on an output of this storage device in the rhythm of clock pulses T which are generated by the pulse generator 39 and which are applied from an output 47 of this generator 39 to a control input of the storage device 46. A digital-to-analog converter 49, for converting the applied digital signal values into analog values, and a correction device 50 are connected to the output of the storage device 46 via a schematically shown bus connection 48, which correction device 50 increments or decrements each digital signal value applied to its input by the storage device 46 by a predetermined bit value in order to correct said signal value depending on a correction signal applied to a control input of the correction device 50. The output of the correction device 50 is connected to the input of the storage device 47 via a bus connection 51, the digital signal values which have been corrected by the correction device 50 being applied to the storage device 46 via this bus connection 51 to replace the digital signal values previously supplied by the storage device 46. In order to generate the correction signal applied to the control input of the correction device 50, there is provided a comparator 52, which receives the detection signal generated by the detection circuit 45 and representing the instantaneous tracking error of a magnetic head $K_1$ or $K_2$, and the analog signal supplied by the digital-to-analog converter 49 and corresponding to the digital signal values stored in the storage device 46. If the detection signal is larger than the analog signal, the comparator 52 supplies a correction signal which causes the correction device 50 to increment the digital signal value applied to it by the predetermined bit value. However, if the detection signal is smaller than the analog signal, the comparator 52 supplies a correction signal which causes the correction device 50 to decrement the digital signal value applied to it by the predetermined bit value. Thus, the storage device 46 stores digital signal values which represent the variation of the tracking error of a magnetic head $K_1$ or $K_2$. The storage device 46 has so many storage locations that it is capable of storing the variation of the tracking errors of both magnetic heads $K_1$ and $K_2$ in two complete consecutive scanning periods P of these heads in the form of digital signal values.

In order to synchronize operation of the storage device 46 with the scanning periods P of the magnetic heads $K_1$ and $K_2$, a pulse signal H, generated by the pulse generator 39 and appearing on an output 53 of this generator, is applied to a further control input of the storage device 46. The pulse signal H always has the same frequency as the pulse signal $H_R$ appearing on the output 40 of the pulse generator 39 and applied to the head-drive servo circuit 35 as the desired-value signal and it is phase-shifted relative to the pulse signal $H_R$ in such a manner that the pulse edges of the pulse signal H always appear at those instants at which a so-called head change occurs i.e., when one of the two magnetic heads stops scanning and the other magnetic head begins to scan. The pulse signal H, for example, has a rising edge if the magnetic head $K_1$ begins to scan a track and a falling edge if the magnetic head $K_2$ begins to scan a track. The pulse signal H is also applied to a control input of the digital switching device 12 for synchronization purposes, which will be described in more detail hereinafter. With respect to the clock pulses T appearing on the output 47 of the pulse generator 39, it is to be noted that their frequency is always a multiple of the frequency of the pulse signals H or $H_R$. In practice, it is found to be effective if, for example, the frequency of the clock pulses T is a factor 32 higher than the frequency of the pulse signals H or $H_R$. In one half-cycle of the pulse signal H, which corresponds to one scanning period P of the magnetic head $K_1$ or $K_2$, sixteen clock pulses T appear, which means that the variation of the tracking error of each magnetic head $K_1$ or $K_2$ is stored in the storage device 46 by means of sixteen digital signal values.

Via a bus connection 54, a first input of a digital summing circuit 55 is connected to a tapping of the storage device 46, the output of this circuit 55 being connected to a further digital-to-analog converter 57 via a further bus connection 56. In order to form the tracking component of the drive signal for the actuator elements A1 and A2, the stored digital signal values appearing on the tapping of the storage device 46 are advanced with respect to those on the output to compensate for subsequent delays. Via the summing circuit 55, whose function will be described hereinafter, these digital signal values are applied to the digital/analog converter 57 for conversion into analog values. For bandwidth limiting and signal shaping, the digital-to-analog converter 57 is followed by a low-pass filter 58 whose output signal is applied to the lines 42 and 43 via a switching-stage device 59 via which lines the output signal can be transferred to the actuator elements A1 and A2.

The switching stage device 59 comprises a first switching stage 60, the pulse signal H appearing at the output 53 of the pulse generator 39 being applied to a control input of this stage 60. Depending on the pulse signal, the switching stage 60 ensures that during a half-cycle of the pulse signal H which begins with a rising edge, the drive signal supplied by the low-pass filter 58 is applied to the actuator element A1 via the line 42 in conformity with the switch position which is symbolically shown in FIG. 1, and that during the next half-cycle of the pulse signal H which begins with a falling edge, the drive signal supplied by the low-pass filter 58 is applied to the actuator element A2 via the line 43. The switching stage device 59 further comprises a second switching stage 61 and a third switching stage 62. Via a control input, the second switching stage 61 is controlled by a pulse signal H1 supplied by the pulse generator 39 on an output 63 of this generator. When the magnetic head K1 begins to scan a track, the pulse signal H1 comprises a short pulse which briefly turns on the second switching stage 61, so that during this pulse the drive signal value supplied by the low-pass filter 58 is transferred to a memory stage 64 arranged after the second switching stage 61. The drive signal value stored in the memory stage 64 is applied to the actuator element A1 via the first switching stage 60 in order to position the magnetic head K1 via the line 42 if the magnetic head K2 scans a track and the magnetic head K1 is not in contact with the magnetic tape. Via a control input, the third switching stage 62 is controlled in the similar manner by a pulse signal H2 supplied by a pulse generator 39 on an output 65 of this generator. If the magnetic head K2 begins to scan a track, the pulse signal H2 comprises a brief pulse which briefly turns on the third switching stage 62, so that during this pulse, the drive signal value supplied by the low-pass filter 58 is transferred to a memory stage 66 arranged after the third switching stage 62. Via the first switching stage 60, the drive signal value stored in the memory stage 66 is applied to the actuator element A2 in order to position the magnetic head K2 via the line 43 if the magnetic head K1 scans a track and the magnetic head K2 is not in contact with the magnetic tape.

In order to generate the sawtooth-shaped control signal whose waveform is adapted to the speed of the magnetic tape 2 and which serves to compensate for the linearly varying tracking-error component, the tracking servo system 41 comprises a variable-waveform digital sawtooth generator 67, the pulse signal H produced on the output 53 of the pulse generator 39 being applied to a control input of this sawtooth generator 67 in order to synchronize the generation of the sawtooth-shaped control signal with the scanning periods P of the magnetic heads K1 and K2. The clock pulses T, appearing on the output 47 of the pulse generator 39, are applied to a further control input of the sawtooth generator 67. For switching over the sawtooth generator 67, switching signals of variable value, appearing on an output 68 of the switching device 12, are applied to a further control input of the sawtooth generator 67. In the present case, the switching signals are formed by digital difference signal values DS(n) which comprise variable bit words. By selection of a specific difference signal value DS(n), which is effected automatically in the switching device 12 in conformity with the speed defined by the switching device 12 by means of the switching signal TW(n) appearing on the output 23 of this device, it is achieved that the sawtooth generator 67 generates a sawtooth-shaped control signal adapted to this speed. The operation of the sawtooth generator 67 for the generation of the sawtooth-shaped control signal will be described in detail hereinafter.

From the output of the sawtooth generator 67, the control signal generated by this generator 67 is applied to a second input of the summing circuit 55 via a bus connection 69, which summing circuit 55 adds the sawtooth-shaped control signal from the sawtooth generator 67 to the tracking signal supplied by the storage device 46 and feeds the sum signal, which constitutes the drive signal, to the actuator elements A1 and A2 via the digital-to-analog converter 57, the low-pass filter 58 and the switching-stage device 59, in the manner described in the foregoing. By means of the drive signals applied to them, the actuator elements A1 and A2 are deflected in such a manner that the magnetic heads K1 and K2 always accurately follow the tracks to be scanned. The generation of a sawtooth-shaped control signal adapted to the instantaneous speed of the magnetic tape ensures that the magnetic heads exactly follow the tracks to be scanned at any speed of the magnetic tape.

As is apparent from FIG. 2, the lengths of the scanning paths of the magnetic heads during reproduction modes with the speeds which differ from the normal speed do not correspond to the lengths of the recorded tracks, which means that unless special steps are taken, the color television signals reproduced by the magnetic heads with speeds which differ from the normal speed will include time-base errors in comparison with the recorded color television signals. This means that the horizontal synchronizing frequency in the reproduced color television signals deviates from the specified standard value, which, in particular, in the case of color television signals, leads to disturbances in the processing of the color signal component. For the still-picture reproducing mode, this problem is described comprehensively in, for example, DE-OS No. 27 41 892 (corresponding U.K. No. 1544057), DE-AS No. 26 46 579, and DE-OS No. 23 48 907 (corresponding U.S. Pat. No. 3869709).

Such time-base errors can be avoided in that the speed of rotation of the magnetic heads K1 and K2 is changed over in conformity with the instantaneous speed of the magnetic tape 2. This means that the head drive device 32 must be switchable with respect to the speed of rotation, which, in the system 1 shown in FIG. 1, is achieved simply in that the period of the pulse signal $H_R$, applied to the head drive servo circuit 35 as the desired-value signal, is changed in conformity with the instantaneous speed. In conformity with the period of the pulse signals applied as desired-values, the head drive servo circuit 35 generates different control signals by the afore-mentioned phase comparison with the actual-value signal supplied by the tachogenerator 36, 37, which control signals are applied to the head drive motor 33 and which result in a speed of the magnetic heads which is defined by the period of the pulse signals applied as desired-value signals.

In order to obtain desired-value signals of variable period, the pulse generator 39 is switchable as regards the period of the pulses it generates. For switching over the pulse generator 39, variable switchings signals can be applied from an output 70 of the switching device 12 to a control input of this generator 39. In the present case, these switching signals are digital timer preset values TV(n) formed by variable bit words. By selection of a specific timer preset value TV(n), which is effected automatically in the switching device 12 in conformity with the speed determined by the switching signal TW(n) appearing on the output 23 of this switching device 12 and in conformity with the control-signal waveform defined by the switching signal DS(n) on the output 68 of this switching device 12, it is achieved that the number of revolutions of the magnetic heads K1 and K2 is adapted to this speed and this control-signal waveform. Thus, for any speed of the magnetic tape, the magnetic heads are accurately guided along the tracks to be scanned with an appropriate scanning speed, which guarantees that the recorded color television signals are always reproduced in an undisturbed and correct manner without time-base errors.

It is to be noted that by applying the switching signals TV(n) to the control input of the pulse generator 39, not only the period of the pulse signal $H_R$ employed as the desired-value signal, but also the periods of all the other pulse signals T, H, H1 and H2 generated by the pulse generator 39 are switched over an in exactly corresponding manner. This is necessary because the scanning periods P of the magnetic heads also change due to the different speeds of the magnetic heads and, consequently, the timing of the circuit sections which are controlled by the further pulse signals from the pulse generator 39, namely, the switching device 12, the storage device 46, the sawtooth generator 67 and the switching-stage device 59, must be adapted to the scanning periods P of the magnetic heads for reasons of synchronization. The operation of the pulse generator 39 for generating the pulse signals will be described in more detail hereinafter.

Figure 3:
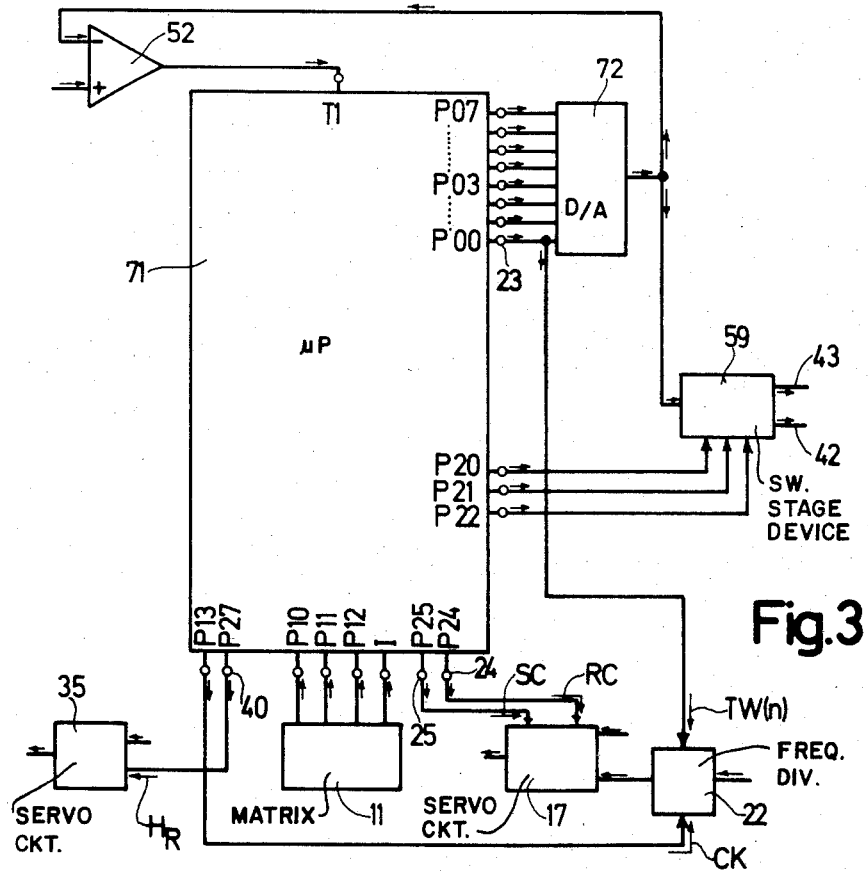
FIG. 3 shows, schematically, a part of the system shown in FIG. 1, employing a microprocessor for constructing the switching device with the stepping signal generator and the sawtooth generator.

It is to be noted that in practice, it is found to be particularly effective and simple if the circuit section 71, within the dashed frame in FIG. 1, is formed by a programmable data-processing unit such as microprocessor. FIG. 3 shows a practical version of this, where the microprocessor 71 is the commercially available microprocessor Intel type 8051. In FIG. 3 some of the pin designations of the microprocessor 8051 are used, the other references being similar to those in the system shown in FIG. 1. Furthermore, it is to be noted that instead of two digital-to-analog converters 49 and 57 as used in the system shown in FIG. 1, only one digital-to-analog converter 72 may be used when the microprocessor 71 is employed, the time-shifted output of the stored digital signal values for the drive-signal generation and for the comparator-signal generation being attainable by an appropriate programming for the relevant storage locations. As the digital-to-analog converter 72, the integrated circuit type TDA 1462 is found to be suitable in practice. The switching-stage device 59 in the system shown in FIG. 3 is formed by the integrated circuit type HEF 4052. In practice, the input circuit 11 may be formed by, for example, a microprocessor Intel type 8050.

How the digital sawtooth generator 67 can be constructed by means of the microprocessor Intel type 8051 as shown in FIG. 3, will be described by means of the flow chart shown in FIG. 4, the description being simplified by the use of the waveform diagrams shown in FIGS. 5a, 5b and 5c. The diagram of FIG. 5a shows the waveform of the pulse signal H appearing on the output 53 of the pulse generator 39, the scanning periods P of the magnetic heads K1 and K2 being indicated in this diagram. In the diagram shown in FIG. 5b, the clock pulses T appearing on the output 47 of the pulse generator 39, are represented schematically by the rising pulse edges. The diagram shown in FIG. 5c illustrates the generated sawtooth-shaped control signal V, whose waveform depends on a number of digital signal values V(i) defined by the clock pulses.

The program is started in block 73. In block 74 a register R0, which serves for counting the clock pulses T, is located with the value 1. In block 75 a register R1, which serves for storing a digital signal value V(i), is loaded with an initial value V(0) for the sawtooth signal, which value is zero in the present example. It is obvious that the initial value V(0) of the sawtooth signal may differ from zero. For example, the initial value V(0) loaded into the register R1 may be a jump-signal value which has been selected so that it causes the relevant magnetic head to jump to another track to be scanned prior to the beginning of a scanning process. In block 76, a register R2 for the storage of a read-in value may be loaded with a difference-signal value DS(n). This difference signal value DS(n) is a bit word which represents the difference between two digital signal values V(i) and V(i+1) which define the waveform of the sawtooth-shaped control signal V to be generated. This means that the waveform of the generated sawtooth-shaped control signal is defined by the differential signal value DS(n). In block 77 the contents of the register R2 is added to the contents of the register R1 and the sum is read into the register R1. In this way the digital signal value V(1)=V(0)+DS(n) is formed. Subsequently, it is ascertained in block 78 whether the pulse signal H comprises an edge, which may be rising or falling. If this is not the case, the occurrence of such an edge is awaited by continuously checking, so that the required time relationship between the pulse signal H, and hence the scanning periods P of the magnetic heads K1 and K2, and the sawtooth-shaped control signal V is established. When an edge appears in the pulse signal H, it is ascertained in the next program step in block 79 whether a rising edge RE occurs in the clock pulse T. If this is not the case, the appearance of such an edge is awaited by checking continually. When such an edge appears the register R0 is incremented in the next program step in block 80, i.e. the contents is incremented by 1. After this it is checked in block 81 whether the contents of the register R0 corresponds to the value 16. This is effected because, as stated previously, sixteen clock pulses T occur in one half-cycle of the pulse signal H. As long as the contents of the register R0 is smaller than the value 16, the contents of the register R2 is added to the contents of the register R1 in the next program step in block 82 and the sum is loaded into the register R1. In this way the digital signal value V(2)=V(1)+DS(n) is formed. In the next block 83, the contents of the register R1, i.e. the digital signal value V(2), is read out as the first digital signal value of the sawtooth generator 67 after the appearance of an edge in the pulse signal H, as can be seen in FIG. 5. This ensures, in a simple manner, that the occurrence of the complete sawtooth-shaped control signal V is advanced in time relative to the scanning periods P of the magnetic heads, which, as stated, is necessary to compensate for subsequent time delays. After the output of the digital signal value V(2) in block 83, it is ascertained in block 84 whether the contents of the register R0 corresponds to the value 1. If this is not the case, the program is continued cyclically via the blocks 79, 80, 81, 82, 83 and 84, the digital signal values V(3), V(4) to V(16) being consecutively read out in block 83, as indicated by the arrows in FIG. 5. After read-out of the sixteenth digital signal value V(16) in block 83 the blocks 84, 79 and 80 are followed again. Subsequently, it is ascertained in block 81 that the contents of the register R0 is 16, after which the program is continued in block 85. In block 85 the register R0 is set to zero and, after this, the initial value V(0) of the sawtooth signal is loaded into the register R1 in block 86. In block 83 the contents of the register R1, i.e. the digital initial value V(0), is read out. Subsequently, it is ascertained in block 84 that the contents of the register R0 is not 1, because this register has just been loaded with the value zero in block 85, so that the program is continued in blocks 79, 80, 81, 82 and 83, the contents of the register R1, i.e. the digital signal value V(1), being read out in block 83. In view of the previous incrementation of the register R0 in block 80 it is ascertained in block 84 that the contents of the register R0 is 1, so that the program is continued in block 78, in which the next edge and the pulse signal H is awaited for reasons of synchronization. After the appearance of this edge the program described is repeated, in which the digital signal values V(2), V(3) . . . V(16), V(0) and V(1) are generated again. These digital signal values V(i) can be converted into an analog sawtooth-shaped control signal V as shown in FIG. 5c by means of a digital-to-analog converter followed by a filter.

As already stated, the waveform of the sawtooth-shaped control signal V depends on the magnitude of the differential signal value DS(n) in the register R2. Therefore, it will be evident that by loading different difference-signal values DS(n) into the register R2, control signals of different waveforms can be obtained, so that in this way the variable-waveform sawtooth generator can be obtained in a particularly simple manner.

How a digital pulse generator 39 can be formed with the aid of a microprocessor type Intel 8051, as shown in FIG. 3, will be described by means of the flow chart in FIG. 6. The generation of the pulse signal $H_R$ applied to the head drive servo circuit 35 as the desired-value signal is described by way of example. The microprocessor Intel 8051 has the possibility of carrying out a so-called internal time-interrupt program. For this purpose there is provided a timer register RT1 which can be loaded with a timer preset value TV(n). The timer preset value is formed by a number with a negative sign which can be written into the timer register RT1 as a bit combination. When the timer register RT1 has been loaded with the timer preset value TV(n) the timer register RT1 is automatically incremented after every microsecond, i.e. the contents of the timer register RT1 is incremented by the value 1. When the contents of the timer register has reached the value zero, the program being carried out in the microprocessor is automatically interrupted and the internal timer program is started. By means of this internal timer interrupt program, it is particularly simple to realize a pulse generator.

The internal timer interrupt program is started in block 87. In block 88 the contents of a register R3, which serves for the storage of the aforementioned timer preset value TV(n), is transferred to the timer register RT1. Thus, it is achieved that the desired timer preset value TV(n) can be written into the register R3 at an arbitrary instant and is not transferred to the timer register RT1 until this value is actually needed. In block 89 the level of the microprocessor output on which the pulse signal $H_R$ appears is inverted, which means that it is switched either from a high level to a low level or, conversely, from a low level to a high level, so that a pulse edge of the pulse signal $H_R$ is produced. The program which has been interrupted by the start of the internal timer interrupt program in block 87 is continued in block 90. During this program the timer preset value TV(n) loaded into the timer register RT1 in block 88 is automatically incremented every microsecond until the contents again reaches the value zero, which results in the timer interrupt program being started automatically in block 87, the next pulse edge of the pulse signal $H_R$ being supplied in block 89.

The time interval between two consecutive pulse edges thus generated, which corresponds to half the period of the pulse signal $H_R$, is thus defined by the timer preset value TV(n). The timer register RT1 is incremented for a longer time and the time interval between the pulse edges, and hence the period of the generated pulse signal, increases as the timer preset value TV(n) increases. Therefore, it will be evident that by loading different timer preset values TV(n) into the register R3, from which they are transferred to the timer register RT1, pulse signals of different periods are obtained, so that a pulse generator supplying pulses of variable periods can be obtained in a particularly simple manner.

In a system for reproducing color television signals from a magnetic tape in different modes with different predetermined speeds of the magnetic tape, as described with reference to FIGS. 1 to 3, it is obvious that a change is possible from a reproduction mode with one speed to a reproduction mode with a different speed. In order to preclude disturbances in the reproduced picture signals which occur in the known systems upon such a change of mode, and which are caused by an abrupt change from one mode to another, the change-over between two modes in the system in accordance with the invention, as shown in FIGS. 1 to 3, is divided into substantially arbitrarily small switching intervals.

For this purpose, the switching device 12 comprises a stepping signal generator 91 symbolically represented by the broken lines in FIG. 1. By actuation of a mode switch 4, 5, 6, 7, 8, 9 or 10 of the mode selection device 3, this generator 91 is operable to supply switching signals TW(n), DS(n) and TV(n) in steps which succeed each other automatically and continuously in the case of a change of mode, their values changing upon every step. By means of these switching signals, which are adapted to one another in a predetermined manner for each step of the stepping signal generator 91, the stepping signal generator 91 effects a stepwise change-over of the tape drive device 13 with respect to the speed of the magnetic tape 2, the sawtooth generator 67 with respect to the waveform of the sawtooth-shaped control signal, and the head drive device 32 with respect to the revolution number of the magnetic heads K1 and K2, in stages which are defined by the values of the switching signals and which are adapted to each other. In this way, the switching process, during a change of mode, is divided into switching intervals defined by the sequence of steps of the switching signals from the stepping signal generator 91. This division of the switching process ensures that the tape drive device 13, the sawtooth generator 67 of the tracking servo system, and the head drive device 32 are changed over in so many almost arbitrarily small corresponding stages which are defined by the values of the switching signals, that the different dynamic properties of the tape drive device 13, the tracking servo system 41 and the head drive device 32 have no effect, thereby ensuring that these three electromechanical systems operate exactly synchronously with each other, not only upon each mode which is started by means of the mode selection device 3 but, also during a change of mode. This ensures that also, in the case of a change of mode, an undisturbed and correct reproduction of the recorded color television signals is achieved.

Hereinafter, a first example of a stepping signal generator 91 will be described. As follows from FIG. 1, the stepping signal generator 91 is formed by means of the programmable data processing unit, namely the microprocessor 71. In this respect, it is found to be advantageous if the values of all the switching sigals TW(n), DS(n) and TV(n) for all the steps of the stepping signal generator 91 are stored in the microprocessor 71 in the form of a table. Such a table is shown schematically in FIG. 7. The switching signals TW(n), DS(n) and TV(n) of each step are given an associated step number Z(n) in order to simplify the retrieval of the switching signals of each step. The numerical values used in practice for the step number Z(n) and the switching signals, namely, the divider words TW(n), the difference signal values DS(n) and the timer preset values TV(n), are given in the table in decimal form, separated by broken lines. With respect to the difference signal values DS(n), it is to be noted that in practice, the numerical values stated in the table correspond to eight times the difference between two digital signal values V(i) and V(i+1) of the sawtooth-shaped control signal in order to obtain integral difference signal values DS(n), so that in order to form the digital signal values V(i), the sawtooth generator 67 shown in FIG. 1, each time, receives the difference signal value DS(n) divided by the value 8. In addition, the table shown in FIG. 7 gives the speeds v(n) of the magnetic tape 2 in the modes which can be selected by means of the mode selection device 3. As follows from the step numbers Z(n), which increase from Z(0) to Z(119), a change in the present system from a mode with seven times the normal speed in the same direction as during normal reproduction to a mode with five times the speed in a direction opposite to that during normal reproduction is divided into 120 steps, which is found to be very favorable in practice. It is obvious that a different number of steps may be selected, for example, a higher number, in order to obtain an even finer division of the switching process.

Figures 8, 9:
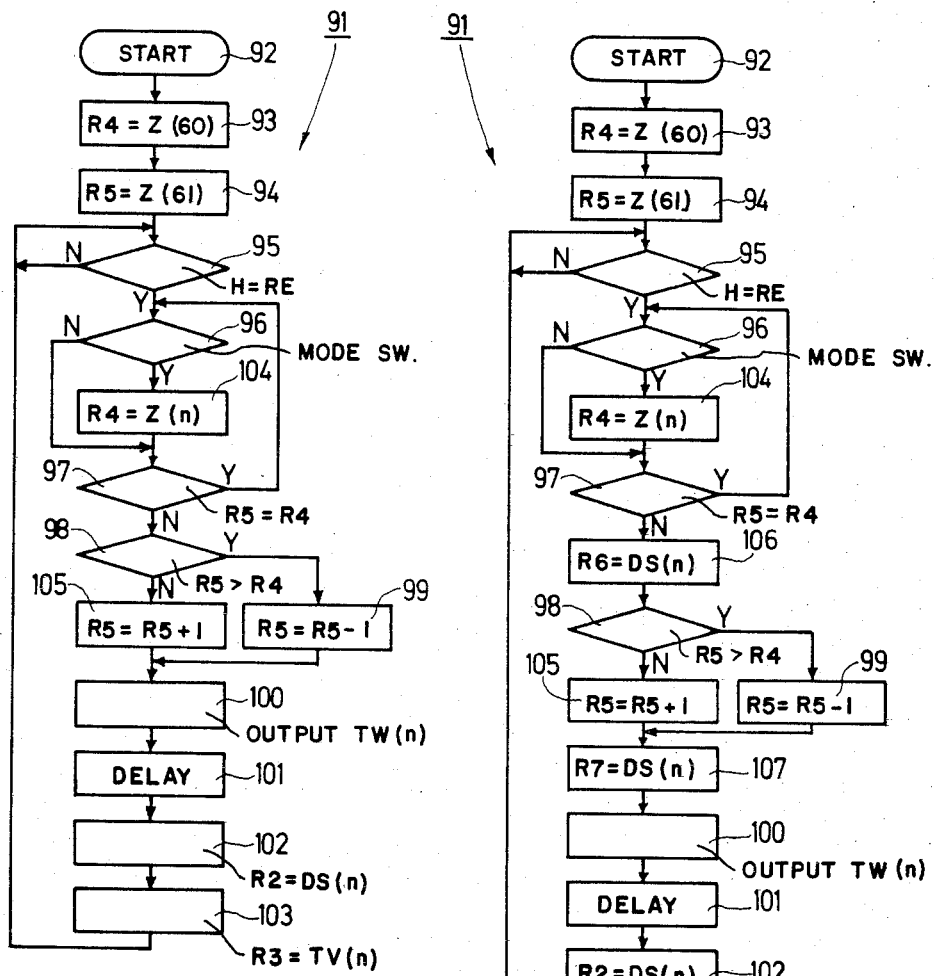
FIG. 8 is a flow chart for a programme sequence used when a stepping signal generator is formed by means of a microprocessor as shown in FIG. 3, the generator supplying the switching signals in steps at equal time intervals.
FIG. 9 is a flow chart for a programme sequence used when a stepping signal generator is formed by a microprocessor as shown in FIG. 3, the generator supplying the switching signals in steps at time intervals which are proportional to the lengths of the stages defined by the values of the switching signals.

By means of the flow chart shown in FIG. 8, it is now described how a digital stepping signal generator 91 is formed by means of the microprocessor 71, Intel type 8051, as shown in FIG. 3. In block 92 the program is started. In block 93 the step number Z(60) is loaded into a register R4, which serves for storing the step number Z(n) of each step of the stepping signal generator, by means of whose switching signals a new mode can be switched on in conformity with an actuated mode switch in the system, i.e. in the present case Z(0), Z(38), Z(60), Z(65), Z(70), Z(78) and Z(119), which step number corresponds to the normal reproduction mode. Subsequently, a register R5, which serves for storing the step number Z(n) of that step with whose switching signal the next switching interval can be started, is loaded with the step number Z(61) in block 94. Then it is ascertained in block 95 whether a rising edge RE occurs in the pulse sigal H, upon whose appearance, as already stated, the magnetic head K1 begins to scan a track. Should this not be the case, the appearance of such a rising edge is awaited, to obtain a specific time relationship between the rising edges of the pulse signal H, and consequently the scanning periods P of the magnetic head K1, and the steps of the stepping signal generator 91, which is found to be effective in practice. Obviously, by checking the pulse signal H for the presence of such a rising edge, it is alternatively possible to establish a time relationship between the steps of the stepping signal generator 91 and the scanning periods of P of the magnetic head K2. If a rising edge is detected in the pulse signal H in block 95, it is ascertained in block 96 whether one of the mode switches 4, 5, 6, 7, 8, 9 and 10 of the mode selection device 3 has been actuated.

If no mode switch has been actuated, it is ascertained in block 97 whether the contents of the register R5 is the same as the contents of the register R4. Since the register R4 has been loaded with the step number Z(60) in block 93 and the register R5 has been loaded with the step number Z(61) in block 94, the result of the check in block 97 will be negative. Therefore, it is checked in block 98 whether the contents of the register R5 is greater than the contents of the register R4, which is the case because the step number Z(61) is higher than the step number Z(60). Subsequently, the contents of the register R5 is decremented in block 99, i.e. the contents of the register R5 is decremented by the value 1. Subsequently, in block 100 the switching signal TW(n) is read out at the step number Z(n) contained in the register R5, which signal is applied to the frequency divider 22 of the tape drive device 13. As a result of this, the tape drive device is switched to the speed defined by the switching signal TW(n). In the present case the step number Z(n) is Z(60) after decrementation in block 99, so that in block 100 the divider word TW(60) is supplied as a switching signal, causing the tape drive device to be set to the normal speed. After the supply of the switching signal TW(n) in block 100, the program is not continued until a predetermined time interval T1 has elapsed in block 101. The length selected for this time interval is as required by the tape drive device 13 actually driving the magnetic tape at the speed defined by the switching signal supplied in block 100. Subsequently, the switching signal DS(n) for the step number Z(n) contained in the register R5 is supplied in block 102, which switching signal DS(n) is loaded into the register R2 of the variable-waveform sawtooth generator 67, which has been described with reference to FIG. 4, thereby defining a waveform of the sawtooth-shaped control signal which is adapted to the speed defined by the switching signal TW(n). Suitably, the switching signal DS(n) is supplied, in principle, at an instant which can be defined by the time interval T1 at which the sawtooth generator 67 shown in FIG. 4 generates the flyback of the sawtooth-shaped control signal. This ensures that the waveform of the sawtooth-shaped control signal is not changed during the generation of the rising portion of this control signal. In the present case, the difference signal value DS(60) is supplied as a switching signal DS(n) which is zero in the normal reproduction mode, so that in this case no sawtooth-shaped control signal is formed. Subsequently, in block 103, the switching signal TV(n) corresponding to the step number Z(n) in the register R5 is supplied, which switching signal TV(n) is loaded into the register R3, from which the switching signal TV(n) is transferred, if necessary, to the timer register RT1 of the variable-period pulse generator described with reference to FIG. 6. The instant at which the switching signal TV(n) is supplied to the register R3 is non-critical, because the transfer of the switching signal TV(n) to the timer register RT1 is synchronized by the timer interrupt program itself. By means of the switching signal TV(n), the pulse generator 39 is set to a period such that the pulse signal $H_R$, supplied by this generator 39 to the head drive device 32 as the desired-value signal, defines a revolution number of the magnetic heads K1 and K2 which is adapted to the speed of the magnetic tape 2 and the waveform of the sawtooth-shaped control signal. In the present case the timer preset value TV(60) is supplied as a switching signal TV(n), resulting in the pulse signal $H_R$ having a period of exactly 40 ms and a revolution number of exactly 25 Hz for the magnetic heads. Thus, if it has been ascertained in block 96 that no mode switch has been actuated, it is ensured by supplying the switching signals TW(60), DS(60) and TV(60) in the blocks 100, 102 and 103 that the tape drive device 13, the sawtooth generator 67 and the head drive device 32 are switched to the operating values required for a normal reproduction mode, i.e. that the normal reproduction mode is started automatically if no other mode has been selected by means of the mode selection device 3. Once the switching signals TW(60), DS(60) and TV(60) have been supplied, the program is continued in block 95, after which it is again ascertained in block 96 whether a mode switch has been actuated after another rising edge has occurred in the pulse signal H, which is checked in block 95. If again no switch has been actuated the next check in block 97 will reveal that the contents of the register R5 is equal to the contents of the register R4, because both registers now contain the step number Z(60) and the program is again continued in block 96. This program loop is repeated as long as no mode switch is actuated.

However, if a mode switch is actuated in order to change the mode of operation, for example, the mode switch 10 in order to switch on the reproduction mode with five times the speed of the magnetic tape in a direction opposite to that during normal reproduction, the check in block 96 will yield a positive result. In block 104 the step number Z(n) is then loaded into the register R4, which corresponds to the mode to be started by actuation of the mode switch, i.e. in the present example, the step number Z(119). Subsequently, the program is continued in block 97, in which the check for equality of the contents of the registers R4 and R5 yields a negative result. The next check in block 98 reveals that the contents of the register R5 is smaller than the contents of register R4, because the register R5 contains the step number Z(60) and the register R4 the step number Z(119). Then the program is continued in block 105, in which the contents of the register R5 is incremented. It is to be noted that by actuation of the buttons 4 or 5 a step number which is smaller than the step number Z(60), namely Z(0) or Z(38) is loaded into the register R4, the program then being continued in block 99 after the check in block 98, upon which as already stated the contents of the register R5 is decremented. After decrementation or incrementation of the register R5 in the blocks 99 or 105, respectively, the switching signals TW(n), DS(n) and TV(n) for the step number Z(n) contained in the register R5, in the present example, the switching signals TW(61), DS(61) and TV(61) for the step number Z(61), are supplied in blocks 100, 102 and 103, respectively, so that the tape drive device 13, the sawtooth generator 67 of the tracking servo system and the head drive device 32 are changed over in conformity with each other in a first small stage defined by the values of the switching signals just supplied. After the switching signals have been supplied, the program is continued in block 95, in which the next rising edge in the pulse signal H is awaited. When this edge appears the program is continued via blocks 97, 98, 105, 100, 101, 102 and 103, upon which the switching signals, in conformity with the next step with the step number Z(62) are supplied. Each time that a rising edge appears in the pulse signal H, the program is completed in an automatic and continuous sequence via blocks 96, 97, 98, 105, 100, 101, 102 and 103, in which the switching signals in conformity with the next steps with the step numbers Z(63), Z(64) ... etc., are supplied. By means of the switching signals of each step, the tape drive device 13, the sawtooth generator 67 and the head drive device 32 are switched over in conformity with each other in small steps defined by the values of the switching signals. In this respect, it is to be noted that when the switching signals for the step number Z(70) are supplied, the switching signal SC is also supplied to the tape drive servo circuit 17 and when the switching signals for the step numbers Z(71) to Z(119) are supplied, the switching signal RC is also applied to the tape drive servo circuit 17 by the digital switching device 12, as already described with reference to FIG. 1.

As soon as the switching signals, by means of which the mode corresponding to the actuated mode switch is started are supplied, in the present example, the switching signals TW(119), DS(119) and TV(119) for the step number Z(119), the check in block 97 of the program starting in block 95 will show that the contents of the register R5 and the register R4 are equal, after which the program is continued in block 96, in which the actuation of another mode switch is awaited, so that no further switching signals are supplied.

Thus, a stepping signal generator 91 is obtained very simply in the manner described above, which generator 91 supplies a multitude of switching signals in steps which succeed each other automatically and continuously, the values of the switching signals changing from step to step in a mutually coordinated manner. In spite of the multitude of switching signals supplied by the stepping signal generator 91, this generator 91 has a very simple construction. The stepping signal generator 91 supplies the signals in consecutive steps at equal time intervals which are defined by the rising edges of the pulse signal H.

FIG. 9 is a flow chart for the formation of a digital stepping signal generator 91 by means of a microprocessor, which generator 91 supplies the switching signals in consecutive steps at time intervals which are proportional to the lengths of the stages which are defined by the values of the switching signals and which are adapted to each other. After block 97 in the program of FIG. 9, the switcing signal DS(n) corresponding to the step number Z(n) contained in the register R5 is loaded into a register R6 in a block 106, which register R6 serves for storing the switching signal DS(n) supplied during a previous step with the step number Z(n). After this, the program is continued in blocks 98 and 99 or 105, respectively, in which the contents of the register R5 is decremented or incremented, respectively. Subsequently, in block 107, the switching signal DS(n) for the step number Z(n) obtained by previous decrementation or incrementation of the register contents of the register R5 is loaded into a register R7, which serves for storing the switching signal DS(n) supplied for the present step with the step number Z(n) obtained by previous decrementation or incrementation. Subsequently, in blocks 100, 102 and 103 the switching signals TW(n), DS(n) and TV(n) for the step number Z(n) contained in the register R5 are supplied. After this, the absolute value of the difference between the contents of the register R7 and the register R6 is formed in block 108, i.e. the absolute value of the difference between the difference signal values DS(n) supplied during consecutive steps of the stepping signal generator is formed and stored in a register R8. The absolute value of the difference is a measure of the magnitude of the steps with which the tape drive device 13, the sawtooth generator 67 of the tracking servo system and the head drive device 32 are switched over. In block 109 the contents of the register R8 is decremented. In block 110 it is ascertained whether the contents of the register R8 is zero. If this is not the case, it is ascertained in block 111 whether a rising edge appears in the pulse signal H. If such a rising edge is not detected, the check for the presence of this edge is repeated continually until it does appear. If such a rising edge occurs in the pulse signal H, the program is continued to block 109, upon which the contents of the register R8 is decremented further. Depending on the original contents of the register R8, i.e. by the absolute value of the difference between the switching signals DS(n) supplied during two consecutive steps, this program loop is followed several times, so that the time interval between two steps of the stepping signal generator 91 is proportional to the magnitude of the switching stages. If the check in block 110 shows that the contents of the register R8 is zero, the program is continued in block 95 to proceed with the next step of the stepping signal generator 91.

Hereinafter, the construction of a digital detection device 112 for detecting the speeds of the magnetic tape by means of a microprocessor 71, type Intel 8051, as shown in FIG. 3 will be described by means of the flow chart in FIG. 10. In order to detect the speed of the magnetic tape 2, the pulse signal, which is generated by means of the tachogenerator 18, 19 of the tape drive device 13, which is supplied by the pulse-processing circuit 20 and which forms the actual-value signal, is applied to the so-called interrupt input of the microprocessor 71 via a dash-dotted line indicated in FIG. 1. Each rising edge of the actual-value signal applied to this interrupt input starts an interrupt program in block 113. In block 114, a register R9 is loaded with the contents of a further timer register RT2 in the microprocessor, whose contents is automatically incremented every microsecond. In block 115 the contents of the timer register RT2 is set to zero. After this the program interrupted by the start of the interrupt program is continued in block 116. During this program, the timer register RT2 is incremented automatically every second, starting from the value zero. As soon as the next rising edge appears in the actual-value signal, the contents of the timer register RT2, which corresponds to the time interval between two rising pulse edges of the actual-value signal, is transferred to the register R9. The time interval between two rising pulse edges of the actual-value signal is a measure of the instantaneous speed of the magnetic tape 2, so that the register R9 of the detection device 112 always contains a digital detection signal corresponding to the instantaneous speed of the magnetic tape 2.

FIG. 11 is a flow chart for a digital stepping signal generator 91 which cooperates with a digital comparator device, which defines the time intervals between consecutive steps of the stepping signal generator 91. The comparator device, which is also formed by means of the microprocessor 71, receives the detection signals stored in the register R9 and produced by the digital detection device 112, described with reference to the flow chart in FIG. 10, and reference signals ZS(n) whose values correspond to the speeds of the magnetic tape defined by the switching signals supplied in steps by the stepping signal generator 91. The values of the reference signals ZS(n) for all the steps of the stepping signal generator 91 are stored in a random-access memory of the microprocessor in the form of a table. This is shown schematically in the last column of the table in FIG. 7. In the present case, the reference signals are formed by the counts ZS(n) in the timer register RT2 for the speeds defined by the switching signals supplied in steps by the stepping signal generator 91 in conformity with the different time intervals between two rising edges of the actual-value signal supplied by the tachogenerator 18, 19 of the tape drive device 13.

In the program shown in FIG. 11, the reference signal ZS(n) for the step number Z(n) in the register R5 is loaded into a register R10 in block 117 after the switching signals TW(n), DS(n) and TV(n) have been supplied in blocks 100, 102 and 103. In block 118 it is subsequently ascertained whether the registers R9 and R10 have the same contents. Thus, it is ascertained whether the detection signal in the register R9 corresponds to the reference signal in the register R10, so that the comparator device is realized simply in block 118. When the contents of the registers R9 and R10 differ, i.e. if the check in block 118 is negative, the check in block 118 is repeated continually. Only when the detection signal corresponds to the reference signal and, consequently, the contents of the registers R9 and R10 are equal, i.e. when the magnetic tape 2 actually has the speed defined by the switching signal TW(n), is the program continued in block 95 in response to the positive result of the check in block 118, enabling the stepping signal generator 91 to supply the switching signals for the next step.

FIG. 12 shows a modification to the example shown in FIG. 11, where a comparator device is used which is external to the microprocessor 71 and which, when the detection signals and reference signals applied to it coincide, supplies a pulse-shaped output signal CO. Such an external comparator device may comprise, for example, a differential amplifier, to one input of which a detection signal supplied by a frequency-voltage converter is applied and to another input of which a reference signal supplied by a switchable voltage divider is applied and which, in the case of coincidence of the applied signals, supplies a pulse-shaped output signal CO via a gate circuit driven by it. After the supply of the switching signals TW(n), DS(n) and TV(n) in blocks 100, 102 and 103 of the program in FIG. 12 it is checked in block 119 whether a starting edge of the afore-mentioned output signal CO occurs. When this is not the case, this check is repeated continually. The program in block 95 is not continued and, consequently, the step switching signal generator 91 is not enabled to supply the switching signals in conformity with the next step until such a starting edge occurs.

As is apparent from the foregoing, various modifications to stepping signal generators are possible for generating a multitude of switching signals whose values vary in steps and by means of which the tape drive device 13, the sawtooth generator 67 of the tracking servo system and the head drive device 32 can be switched over in substantially arbitrarily small steps which are adapted to each other, in order to guarantee a correct and undisturbed picture reproduction during a change of mode.

It is obvious that within the scope of the present invention, several variants to the examples described are possible. For example, such a system may serve for the reproduction of digital information signals. Alternatively, such a system may serve for the reproduction of black-and-white television signals, in which case only the tape drive device and the sawtooth generator of the tracking servo system have to be switched over in substantially arbitrarily small steps in the case of a change of mode. Also with respect to the timing of the switching signals of each step, there are several possibilities adapted to specific requirements; if desired, the switching signals of each step may be supplies consecutively in the rhythm of the program without a predetermined time interval between the instants at which two switching signals are supplied. As regards the entry of the desired reproducing modes with different speeds of the magnetic tape, for which, in the embodiments described, a mode selection device with separate mode switches for each mode is provided, it is, obviously, also possible to provide a mode selection device equipped with a potentiometer, a specific potentiometer setting defining a specific speed of the magnetic tape and each potentiometer setting having a corresponding digital bit combination representing the step number of the stepping signal generator whose switching signals start the reproduction mode of the system whose speed is defined by the potentiometer setting, in the same way as in the case of the actuation of each mode by means of separate mode switches. Such a mode selection device comprising a potentiometer simply enables a comparatively large number of predetermined speeds to be selected for the reduction of information signals. Obviously the switching device supplies several other switching signals when a reproduction mode of the system is selected, as is indicated by a number of further outputs in the embodiment shown in FIG. 1.

What is claimed is:

1. A system for reproducing information signals recorded on a magnetic tape in parallel adjacent tracks which extend obliquely relative to the longitudinal direction of said tape, in different modes of operation with different predetermined speeds of the magnetic tape, said system comprising a tape drive device, having a control input, for driving the magnetic tape at different speeds; at least one magnetic head; a head drive device, for rotating said magnetic head causing said magnetic head to consecutively scan said tracks; and a tracking servo system for causing said magnetic head to accurately scan said tracks, said tracking servo system including an electromechanical positioning device for adjusting the position of said magnetic head in a direction transverse to said tracks, a control circuit for generating a tracking signal for said electromechanical positioning device, and a variable-waveform sawtooth generator, having a control input, for generating a sawtooth waveform for said electromechanical positioning device to correct for tracking errors due to the speed of reproduction being different from the speed at which said tracks were recorded; said system further comprising a mode selection device with which an operator may select any of said modes of operation, and a switching device coupled to said mode selection device for applying, respectively, a first control signal (TW) to the control input of said tape drive device for controlling the speed of said magnetic tape, and a second control signal (DS) to the control input of said variable-waveform generator for controlling the amplitude and frequency of said sawtooth waveform, said first and second control signals being co-related so that at any speed of the magnetic tape corresponding to a particular value of said first control signal, a respective particular value of said second control signal adjusts said tracking servo system to cause said magnetic head to accurately scan said tracks, said switching device generating different respective values of said first and second control signals depending upon which of said modes is selected by the operator; characterized in that said switching device comprises a stepping signal generator activated by a change from a first mode to a second mode in said mode selection device, said stepping signal generator causing at least said first and second control signals to change incrementally, in a plurality of respective steps, from respective first values, corresponding to said first mode, to respective second values, corresponding to said second mode, said incremental changing of said first and second control signals being synchronous and said steps being respectively sized to maintain said co-relationship between said first and second control signals, whereby upon initiation of a mode change in said mode selection device, each incremental change in said first and second control signals does not exceed the dynamic responses of said tape drive device and said tracking servo system so that the quality of a picture on display is not degraded during a change from one mode of operation to another mode.

2. A system as claimed in claim 1, wherein said head drive device rotates said magnetic head at different speeds in response to signals applied to a control input thereof, and said switching device applies a third control signal (TV) to the control input of said head drive device for controlling the rotational speed of said magnetic head, said third control signal also being co-related with said first and second control signals, and said switching device generating different values of said third control signal depending upon which of said modes is selected by the operator, characterized in that said stepping signal generator also causes said third control signal to change, incrementally in a plurality of steps, from a first value, corresponding to said first mode, to a second value, corresponding to said second mode, said incremental changing of said third control signal being synchronous with the incremental changing of said first and second control signals, and said steps being sized to maintain said co-relationship with said first and second control signals.

3. A system as claimed in claim 1, characterized in that said plurality of steps of said first and said second control signals occur at equal time intervals.

4. A system as claimed in claim 1, characterized in that said plurality of steps of said first and said second control signals occur at time intervals which are proportional to the amount by which the values of said first and second control signal must change between said first and said second modes of operation.

5. A system as claimed in claim 1, characterized in that the stepping signal generator supplies the first and second control signals in said plurality of steps at time intervals which are defined by a comparator device which cooperates with the stepping signal generator, detection signals suppled by a detection device which cooperates with the magnetic tape to detect the speeds of said tape and reference signals whose values correspond to the speeds of the magnetic tape as defined by the first control signal supplied in steps by the stepping signal generator being applied to the comparator device for comparison, which comparator device enables the stepping signal generator to supply said first and second control signals in conformity with a next step when the signals applied to said comparator device coincide.

6. A system as claimed in claim 5, characterized in that the stepping signal generator is formed by means of a programmable data processing unit.

7. A system as claimed in claim 6, characterized in that the data processing unit is also employed for forming the comparator device and the detection device.

8. A system as claimed in claim 7, characterized in that the data processing unit comprises means for storing the values of the reference signals applied to the comparator device for all the steps of the stepping signal generator in the form of a matrix.

9. A system as claimed in claim 6, characterized in that the data processing unit comprises means for storing the values of all the steps in said first and second control signals in the form of a matrix.

10. A system as claimed in claim 2, characterized in that said plurality of steps of said first, second and third control signals occur at equal time intervals.

11. A system as claimed in claim 2, characterized in that said plurality of steps of said first, second and third control signals occur at time intervals which are proportional to the amount by which the values of said first, second and third control signal must change between said first and said second modes of operation.

12. A system as claimed in claim 2, characterized in that the stepping signal generator supplies the first, second and third control signals in said plurality of steps at time intervals which are defined by a comparator device which cooperates with the stepping signal generator, detection signals supplied by a detection device which cooperates with the magnetic tape to detect the speeds of said tape and reference signals whose values correspond to the speeds of the magnetic tape as defined by the first control signal supplied in steps by the stepping generator being applied to the comparator device for comparison, which comparator device enables the stepping signal generator to supply said first, second and third control signals in conformity with a next step when the signals applied to said comparator device coincide.

13. A system as claimed in claim 12, characterized in that the stepping signal generator is formed by means of a programmable data processing unit.

14. A system as claimed in claim 13, characterized in that the data processing unit is also employed for forming the comparator device and the detection device.

15. A system as claimed in claim 14, characterized in that the data processing unit comprises means for storing the values of the reference signals applied to the comparator device for all the steps of the stepping signal generator in the form of a matrix.

16. A system as claimed in claim 13, characterized in that the data processing unit comprises means for storing the values of all the steps in said first, second and third control signals in the form of a matrix.

* * * * *